Patented Apr. 16, 1929.

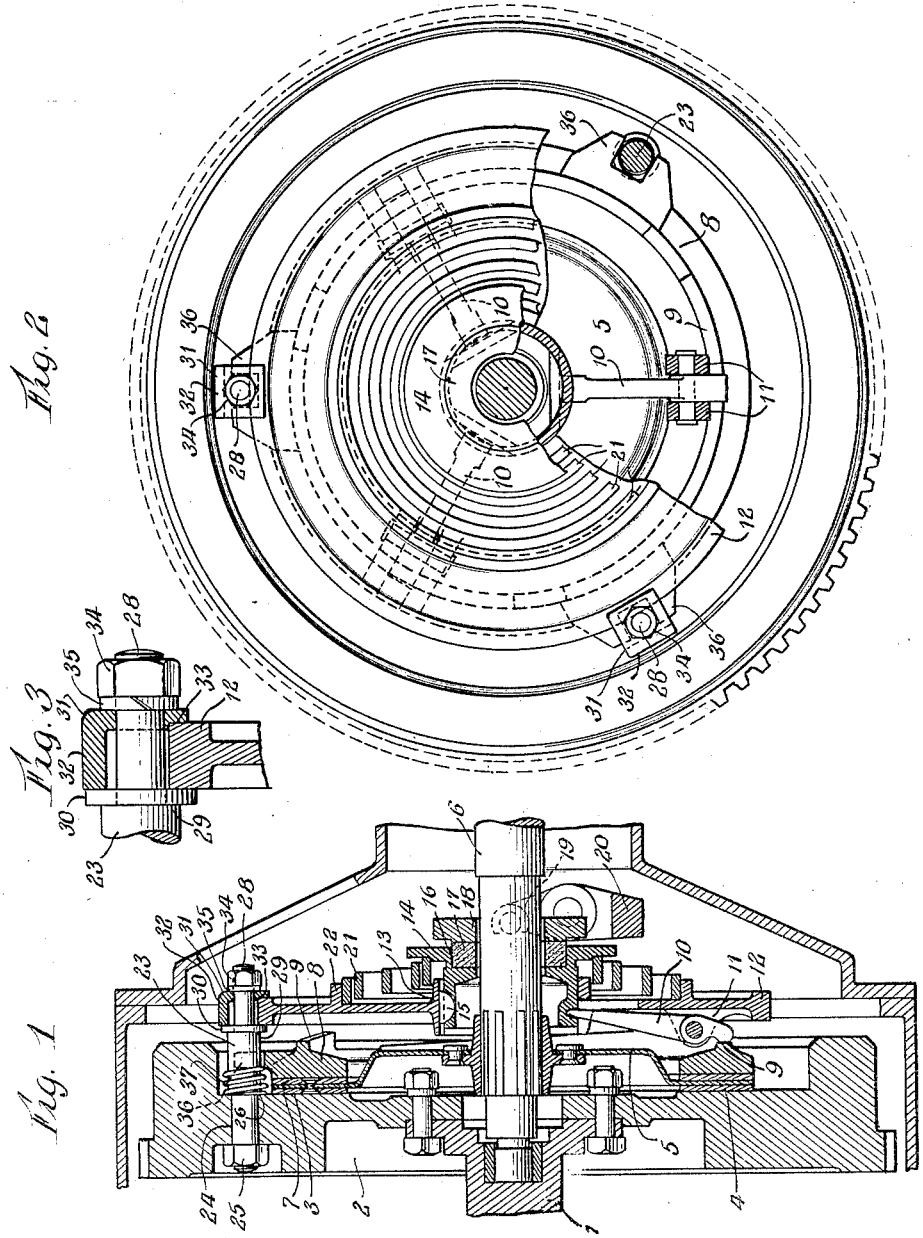

1,708,967

UNITED STATES PATENT OFFICE.

DAVID E. GAMBLE, OF DETROIT, MICHIGAN, ASSIGNOR TO THE BORG & BECK COMPANY, OF CHICAGO, ILLINOIS, A CORPORATION OF ILLINOIS.

CLUTCH.

Application filed November 3, 1924. Serial No. 747,461.

This invention relates to a novel and improved clutch of the type wherein a driving shaft imparts movement to a driven shaft through the means of a friction disk splined on the driven shaft and contacting with a fly-wheel or the like upon the driving shaft. In this type of clutch a cam ring is provided to contact with the face of the friction disk opposite to the fly-wheel, friction rings of suitable anti-friction material being interposed between the friction disk and the fly-wheel on the one side and the cam ring on the other. The cam ring is forced towards the disk causing the latter to engage with the fly-wheel, by means of a plurality of levers operated by a sleeve surrounding the driven shaft and controlled by means of a spring normally urging the levers into engagement with the cam ring to force the friction disk towards the fly-wheel. The spring which acts on the sleeve is usually carried by a cover plate having an opening therein to receive the sleeve and the driven shaft.

This cover plate also supports either directly or through intermediate means, the levers which act upon the cam ring and adjustment for wear or to vary the force exerted by the spring is attained by rotation of the cover plate. The cover plate is carried by the fly-wheel to rotate therewith and it is one of the principal objects of this invention to provide means for supporting the cover plate from the fly-wheel in an efficient manner and one which may be readily employed with various types of fly-wheels.

A still further object is to provide a supporting means for the cover plate which may also be employed as a support and guide for the cam ring.

A still further object is to provide a novel and improved means for effecting a positive disengagement of the cam ring upon release of the clutch, thereby insuring a prompt discontinuance of the driving connection between the two shafts.

In the accompanying drawings in which I have shown a selected embodiment of my invention, Fig. 1 is a longitudinal sectional view through my improved clutch;

Fig. 2 is an end elevation of my improved clutch viewed from the right of Fig. 1 and certain parts being broken away for the sake of clearness and Fig. 3 is an enlarged view of a detail.

Referring now to the drawings, the numeral 1 designates a driving shaft having secured thereto a fly-wheel 2 having a driving face 3 which engages with the friction ring 4 carried by the friction disk 5, splined upon the driven shaft 6. Upon the opposite side of the disk 5 is mounted a second friction ring 7 contacting with a cam ring 8, the cam surfaces 9 of which are engaged by a plurality of levers 10 pivoted upon lugs 11 projecting from the cover plate 12.

The plate 12 is provided at its center with an opening through which passes the driven shaft 6 and this opening is surrounded with a flange 13 on the plate and which supports a sleeve 14 keyed to the plate 12 as at 15, whereby it will rotate with the plate but may have movement longitudinally of the driven shaft. Received within a recess 16 in the sleeve, is a bearing 17 of suitable anti-friction material, preferably of such a character that its wear will compensate for the wear upon the surface 3, cam ring 8 and friction rings 4 and 7. Engaging the bearing 17 is a clutch release collar 18 supported by a fork 19 of a clutch release lever 20. The sleeve 14 is yieldingly urged to the right (Fig. 1) by a coil spring 21 supported on the plate 12 as by the flange 22 and engaging the sleeve.

The structure so far described, forms no part of this invention, it being disclosed and claimed in my co-pending application, Serial No. 747,460 filed November 3, 1924. It is desirable to support the plate 12 and all parts carried thereby, free from the driven shaft 6 so that upon release of the clutch, this shaft will cease to rotate at the earliest possible moment and the rotation will not be continued by the inertia of heavy parts rotating with the shaft. It will be evident that all of the parts of the clutch in this embodiment, are free from the driven shaft with the exception of the friction disk which is splined thereto and that the levers 10, the sleeve 14, the bearing 17 and the spring 21, are carried by the plate 12. The plate 12 is supported by a plurality of bolts 23 passing through the fly-wheel and secured in place as by nuts 25. Each bolt is provided with a shoulder 26 engaging the face 3 of the fly-wheel and is reduced at its outer end as at 28 to form a shoulder 29. Resting against this shoulder and surrounding the reduced portion 28 is a washer 30.

As will be evident from an inspection of the drawings, the plate 12 is of a diameter to fit within the bolts 23 at their reduced portions 28 and to be supported thereby. The plate rests against the washers 30 and is held in place by a plurality of clips 31, one on each bolt. These clips are shown as provided with two right angled legs, one of which, 32 rests against the washer 30 and the other of which contacts with the outer face of the plate 12 and is preferably recessed as at 33 to form a shoulder to space the plate slightly from the bolt. Each clip is secured in place by a nut 34 and a suitable lock nut 35.

The cam ring 8 is provided with a plurality of pairs of lugs 36, each pair receiving between its members a bolt 23. Surrounding each bolt 23 between the fly-wheel and the lugs 36 is a coiled compression spring 37 normally urging the cam ring towards the right (Fig. 1).

In operation, the cam ring is normally urged towards the left (Fig. 1) by the levers 10 which are acted upon by the spring 21 through the sleeve 14 and thus a frictional driving engagement is caused between the driving and driven shafts because of the engagement of a surface 3 of the fly-wheel with the friction ring 4 and because of the engagement between the cam ring 8 and the friction ring 7. It is of course, understood that the strength of the spring 21 is greatly superior to that of all the springs 37. Upon actuation of the clutch release lever 20 the sleeve 14 is moved against the force of the spring 21 thus releasing the pressure of the levers upon the cam ring and release of the cam ring from the friction ring 7 is caused by the springs 37. There are then no parts rotating with the driven shaft except the friction disk which is splined thereto, all other parts being carried by the fly-wheel and supported free of the driven shaft, thus making it possible for the driven shaft to come to a quick stop. Moreover the parts carried by the fly-wheel are supported in an efficient manner and by means which may be easily embodied in a wide variety of types of fly-wheels, and in such manner as to permit of ready adjustment of the plate 12 when such adjustment is desired.

I am aware that changes in the form, construction and arrangement of parts may be made without departing from the spirit and without sacrificing the advantages of the invention and I reserve the right to make all such changes as fairly fall within the scope of the following claims.

I claim:

1. In a clutch, a driving shaft, a fly-wheel carried thereby, a driven shaft, means to clutch said driven shaft to said fly-wheel comprising a ring having cam surfaces thereon, means to control said clutching means and comprising levers engaging said cam surfaces, a plate carrying said controlling means, a plurality of bolts carried by said fly-wheel and supporting said plate, and means to rotatably adjust said plate on said bolts to shift the position of the levers relative to said cam surfaces.

2. In a clutch, a driving shaft, a driven shaft, means to clutch said shafts together, a plurality of bolts supported by said driving shaft, shoulders on said bolts, washers on the bolts against the shoulders, a plate fitting within said bolts against said washers, clips spacing the plate from the bolts, and means securing the clips on the bolts.

3. In a clutch, a driving shaft, a driven shaft, means to clutch said shafts together, a plurality of bolts supported by said driving shaft, shoulders on said bolts, washers on the bolts against the shoulders, a plate fitting within said bolts against said washers, angle clips engaging the washers and having shoulders engaging the plate to space the plate from the bolts, and means securing the clips on the bolts.

4. In a clutch, a driving shaft, a fly wheel carried thereby, a plurality of bolts on the fly wheel, a driven shaft, means to clutch said driven shaft to said fly wheel comprising a ring having cam surfaces thereon, means to control said clutching means and comprising levers engaging said cam surfaces, and a plate carrying said controlling means, said cam ring being non-rotatively supported on said bolts and said plate being rotatively supported on said bolts to enable adjustment of the levers with respect to said cam surfaces.

DAVID E. GAMBLE.